April 21, 1970  A. COUCOULAS  3,507,033
ULTRASONIC BONDING METHOD
Filed Aug. 31, 1966  3 Sheets-Sheet 1

INVENTOR.
ALEXANDER COUCOULAS
BY
Ostrolenk, Faber, Gerb & Soffen
ATTORNEYS

# United States Patent Office 3,507,033
Patented Apr. 21, 1970

3,507,033
ULTRASONIC BONDING METHOD
Alexander Coucoulas, Bridgewater Township, Somerset County, N.J., assignor to Western Electric Company, Incorporated, New York, N.Y., a corporation of New York
Continuation-in-part of application Ser. No. 423,746, Jan. 6, 1965. This application Aug. 31, 1966, Ser. No. 591,068
Int. Cl. B23k 27/00
U.S. Cl. 29—470.3     10 Claims

ABSTRACT OF THE DISCLOSURE

By carrying out ultrasonic bonding of copper or aluminum leads to substrates at a temperature above their respective recrystallization temperatures and in their hot working temperature ranges, bond strength and reliability are substantially improved. It has been discovered that by bonding under these conditions, the lead is substantially recrystallized during the bonding cycle.

---

This application is a continuation-in-part of U.S. application Ser. No. 423,746 filed Jan. 6, 1965 now abandoned.

This invention relates generally to bonding and, more particularly, it relates to the bonding of workpieces by a combination of ultrasonic energy and heat. In accordance with the invention, one of the workpieces is heated in the bond region prior to and during the application of ultrasonic vibratory energy. A clamping force holds the pieces together. More specifically, one of the workpieces is heated to a temperature within the range at which no significant strain hardening takes place, notwithstanding the deformation induced in the workpiece by the ultrasonic energy. The heating is to a temperature where recrystallization occurs during welding of the workpiece, within its hot working temperature range. This is of course much below the melting point. Bonds produced by the method of the invention are characterized by a partially or fully recrystallized structure.

In a preferred embodiment of the invention, the bond surfaces and bond region are maintained in an inert or reducing atmosphere during heating.

At the outset it is noted that ultrasonic bonding with heat is disclosed in the prior art, as for example in U.S. Patent 2,946,119 issued July 26, 1960 to J. B. Jones et al. and entitled "Method and Apparatus Employing Vibrating Energy for Bonding Metals." However, this patent discloses only that heating may be beneficial in some instances, and does not teach or disclose specific temperature ranges for heating. Another patent of interest is No. 3,051,826 of A. J. Avila, entitled "Method and Means for Ultrasonic Energy Bonding," which is assigned to the same assignee as the instant application. This patent teaches the use of heat and ultrasonic energy to produce an eutectic bond, which of course means that a liquid phase must be produced during bonding. The present invention discloses a critical temperature range whereby the strength and reliability of the final bond are substantially enhanced.

During ordinary ultrasonic bonding, cold working normally is induced in the workpiece despite the interfacial temperature rise resulting from the elastic hysteresis of the highly stressed portion of the bond zone. This temperature rise at the interface may be sufficient to induce partial recrystallization in this immediate area, but the mass of material away from the interface is subjected to severe cold working and embrittlement. It has now been determined that bond failure most often occurs in the cold worked area, rather than at the interface. In the bonding of electrical leads this not only makes a brittle connection due to the resultant strain hardening, but also raises the resistance of the connection. In bonding leads to thin films mounted on brittle substrates such as ceramic or glass, ultrasonic bonding suffers the additional disadvantage of causing microcracks or actual localized fracture of the substrate, which can lead to complete bond failure. Thermocompression bonding has only limited application in such a situation, particularly where oxide films are present, and as a result of these problems, bonding to thin films has generally been accomplished by using soft solders.

Soft solders, while making reasonably strong bonds, also suffer from disadvantages. Foreign atoms are introduced at the interfaces, a second interface is present, and maximum working temperature is limited.

It is a general object of the present invention to provide a bonding method which overcomes the foregoing disadvantages.

Another object of the present invention is to provide a bonding method which does not embrittle the workpieces by strain hardening.

Still another object of the present invention is to provide a bonding method which produces low resistance bonds.

Yet another object of the present invention is to provide a bonding method suitable for use with thin films attached to brittle substrates.

A still further object of the present invention is to provide a bonding method which produces bonds with improved mechanical strength.

Yet another object of the present invention is to provide a bonding method which utilizes lower temperatures and mechanical loads than thermocompression bonding.

A still further object of the invention is to provide a bonding method which utilizes lower ultrasonic power levels and mechanical loads than ultrasonic welding.

Another object of the invention is to provide a bonding process wherein the oxidation potential of the interfaces is minimized.

Various other objects and advantages of the invention will become clear from the following discussion of several embodiments thereof.

Understanding of the invention will be facilitated by a brief discussion of the individual phenomena associated therewith.

The mechanical deformation of metals at low temperatures, often called cold working, results in the slipping of planes of atoms in the crystal lattice over each other. This distorts the original grain structure of the metal in the direction of the deformation. Part of the energy of deformation is stored in the distorted grain boundaries, and this causes the effect known variously as strain hardening or work hardening. When such a strain hardened structure is heated, two things happen. First, there is a recovery stage wherein the stored strain energy becomes evenly distributed throughout the structure. At relatively low temperatures this is the same thing as stress-relief annealing. When the temperature exceeds the so-called recrystallization temperature, new strain-free grains are nucleated, and over a period of time these new grains completely consume the old deformed structure. This is called recrystallization. If the structure is maintained at this temperature for a longer time, the grains will grow larger, at each other's expense. Each of these stages, recovery, recrystallization and grain growth, represents a successively lower energy state and proceeds quite spontaneously.

While the term "recrystallization temperature" implies a definite minimum temperature for these phenomena to occur, it must be understood that there is a time-temperature relation involved. Thus, a piece of severely cold worked copper will recrystallize at room temperature in about one year. The same piece will recrystallize in a few minutes at 225° C. A piece of cold worked brass (33% reduction) will completely recrystallize in 8 seconds at 580° C. Thus, when the term recrystallization temperature is used, it is understood that it means the temperature at which recrystallization will be completed within a particular time period.

A number of factors affect recrystallization temperature. The grain size before deformation is one of these, the larger the grain the higher the temperature. Alloying elements have a significant effect; ordinary industrial aluminum will recrystallize at 200° C. but high purity grades will do so at 100° C. The degree of deformation affects not only the recrystallization temperature but also the size of the re-formed grains. Thus, the recrystallization temperature of a particular piece of metal will depend on its composition and thermal and mechanical history. Despite the number of variables which can affect recrystallization temperature, there are well accepted minimum recrystallization temperatures and well accepted hot working temperature ranges for most common metals (Mantell, Engineering Materials Handbook, McGraw-Hill, 1958).

Hot working, as distinguished from cold working, is defined as mechanical deformation above the recrystallization temperature of the metal (An Encyclopaedia of the Iron and Steel Industry, Philosophical Library, New York, N.Y., 1956). The "hot working temperature range" thus defines that range where the strain energy does not build up in the metal on deformation, but is rather continuously recovered or relieved. The mechanism can be considered analogous to cold working with simultaneous stress relief or recovery. It is not known whether recrystallization starts during or after hot working generally, but in the case of bonding in accordance with the present invention, recrystallization does start during bonding.

The theoretical upper limit of the hot working temperature range is the melting point of the pure metal or the solidus in the case of an alloy. Practically, however, it is considerably lower, since the metal is in danger of losing structural integrity at the higher temperatures. In the bonding of leads to thin film circuit elements mounted on brittle substrates, the upper temperature limit should be such that any damage to the thin film or distortion of the substrate is avoided. Usually, however, these materials are quite refractory and this is not a limiting factor. Thus, as used herein, the term "hot working temperature range" means a temperature above the recrystallization temperature of the workpiece but below any of the above-mentioned upper limits.

Ultrasonic vibratory energy effects bonds or welds between interfaces by inducing certain frictional phenomena and reducing the yield stress of the materials. The yield stress is the load required to produce plastic, as opposed to elastic, deformation. Reduction in yield stress during ultrasonic bonding is attributed by some workers to selective attenuation of the vibratory energy at dislocation sites (vacancies in the crystal lattice), raising their energies and permitting dislocation movement under a small applied stress. The ultrasonic vibration of one of the workpieces produces a scrubbing effect which is believed to disrupt oxide films and expose nascent metal surfaces so that a real metallurgical bond can be developed.

With the foregoing factors in mind, the invention will now be described, and reference will be made to the accompanying drawings, in which:

FIGURES 2 and 3 are histograms showing the frequency strength distribution of aluminum leads ultrasonically bonded to tantalum thin films in which FIGURE 2 shows the distribution for bonds without heat and FIGURE 3 shows the distribution for bonds made in accordance with this invention.

Figure 1:
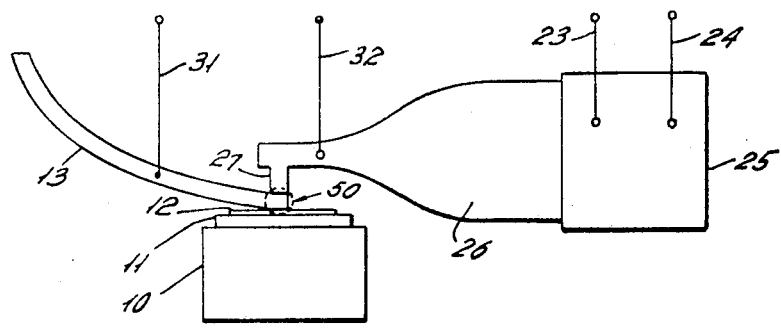
FIGURE 1 is a schematic diagram of an ultrasonic bonding apparatus and workpieces to be bonded, illustrating how resistance and/or gas heat can be applied to one of the workpieces to effect bonding in accordance with the invention.

By way of example, the present invention will be described in connection with the ultrasonic bonding of lead or wire 13, which may be, for example, aluminum or copper, to a thin film 12 sputtered on a glass substrate 11. It will be understood that the invention has many other applications, but bonds to thin films are discussed herein because the difficulties prior workers have experienced with such bonds emphasizes the advance represented by the invention. The lead 13 is heated to a temperature, prior to and during the introduction of ultrasonic vibratory energy, within its hot working temperature range.

As noted hereinabove, the present invention provides for heating of one workpiece to a temperature at which no significant strain hardening takes place in the portion of the workpiece subjected to deformation during the ultrasonic bonding cycle. This "portion" of the workpiece which is heated is defined as the "bond region." The "bond region" includes that volume of the second workpiece 13 that extends from the interface of the bond tip 27 and second workpiece 13 to the interface of the second workpiece 13 and first workpiece 11–12, as well as the volume of the second workpiece adjacent thereto that will also ultimately undergo deformation during the ultrasonic bonding cycle.

The "bond area," as distinguished from the "bond region," is that area that represents the interface between the first and second workpieces.

Briefly, the procedure employed in carrying out the invention is as follows:

(1) the substrate or first workpiece 11 is positioned and clamped in any suitable manner on the base plate or anvil 10.

(2) The lead 13 is positioned under the bonding tip 27 of the ultrasonic bonding horn 26, and its intended bond area is placed on top of the intended bond area of the first workpiece 11–12.

(3) A sufficient holding force is applied by way of the ultrasonic bonding horn 26 to hold the lead 13 in contact with the thin film 12 when ultrasonic vibrating energy is transmitted from the ultrasonic bonding horn 26 to the workpieces. This holding force is applied in a direction perpendicular to the interface of the lead 13 and thin film 12, i.e. downwardly.

(4) At least the bond region of the lead 13 is heated to a temperature at which no significant strain hardening will occur during deformation process, i.e. the hot working temperature range.

Heating can be achieved by any suitable method or means. For example, resistance heating can be used by attaching a first conductor 31 to the workpiece 13 and a second conductor 32 can be attached to the ultrasonic bonding horn 26. The first and second conductors 31 and 32 are connected in any convenient manner, as for example, by means of alligator clips. Current from a power supply (not shown) passes through the conductor 32, the ultrasonic bonding horn 26, bonding tip 27, interface of the bond tip 27 and second workpiece 13, through the second workpiece 13 to the conductor 31 and back to the power supply. It will be understood that experiments with thermocouples will aid in determining the magnitude of current and length of preheat time required to raise the bond region to the required temperature range. Once these parameters have been determined for a particular type of workpiece, it will not be necessary to continuously check temperature when this apparatus is used for mass-production bonding.

Other methods of heating the bond region can also be used, as for example gas heating. In FIGURE 1 there is schematically illustrated a spray nozzle 50. The gas can be passed through a resistance heat gun and directed through the cylindrical nozzle 50 to the bond region. The flow of gas can be regulated and the temperature thereof can be selected by varying the electric power of the heat gun for a given rate of flow. Other methods of heating, for example infra-red heating, a combination of resistance and gas heating, etc., can also be employed as long as the bond region is heated to the hot working temperature range.

(5) In accordance with a preferred embodiment of the invention, an inert or reducing gas is supplied by nozzle 50. Hydrogen or forming gas (90% nitrogen, 10% hydrogen) are suitable for this purpose. Such an atmosphere has several possible advantages during bonding, principal among which are a lowering of the oxidation potential of the interfaces, and actual reduction of surface oxides present in the bond region. An inert atmosphere, such as argon, should also be helpful in oxide removal, as it upsets the equilibrium partial pressure of oxygen on the surface, thus tending to break down oxides. A further advantage of these special atmospheres may be that by helping to expose nascent metal surfaces, the creep rate is increased and deformation becomes easier (Sweetland et al. "Effect of Surface Condition on Creep of Some Commercial Metals," J. of Appl. Mech., vol. 20, March 1953). It is to be noted that the special atmosphere may or may not be heated and act as the heat source.

(6) When the bond region of second workpiece 13 is preheated to its hot working temperature range, the ultrasonic energy is applied to horn 26 and tip 27 from the ultrasonic bonder power supply, through conductors 23 and 24 and transducer 25. The ultrasonic bonder and its circuit are represented schematically since such units are well known in the art. The ultrasonic vibratory energy from bonding tip 27, at a conventional frequency such as 40 kc., is applied with sufficient magnitude to bond workpiece 13 and 11–12 together, and is preferably applied in a direction perpendicular to the holding force for the workpieces. That is, the direction of vibration is in the plane of the bond interface. This gives the desired scrubbing action. It is noted that the ultrasonic energy is introduced and applied while simultaneously continuing to deliver heat to maintain lead 13 in the hot working range. If desired, a timer can be used to insure that the workpieces are properly heated before the ultrasonic vibratory energy is introduced.

(7) After sufficient time to bond the workpieces together, the application of the ultrasonic energy is terminated. In most cases, the heating of the bond region can be terminated simultaneously, as recrystallization will be substantially complete by the time the workpiece is cooled to a point where recrystallization stops or is extremely slow. Perhaps the most surprising aspect of the present invention is the fact that the bond region is fully recrystallized in the normal time period of an ultrasonic bonding cycle. This is discussed more fully hereinbelow.

Some of the advantages of bonding by this method are as follows:

(1) The ultrasonic bonding energy necessary to effect a good bond decreases when the workpiece is heated to the hot working temperature range prior to and during the ultrasonic bonding cycle.

(2) With the workpiece in the hot working temperature range, the amount of energy transmitted to the substrate is considerably decreased, thus eliminating the possibility of microcracking or fracture of brittle substrates. This is due to the fact that the heated workpiece is in a plastic state, so less ultrasonic energy is required to bond, and since the workpiece is softer, less energy is transmitted to the substrate. In other words, the vibratory energy is attenuated in a shorter distance.

(3) The increase in the electrical resistivity of the workpiece in the vicinity of the bond region is eliminated when it is kept in the hot working temperature range during bonding, since there is no cold working and a recrystallized structure results.

(4) The process produces a greater area of contact between the workpieces, which improves the mechanical strength of the bond and lowers the electrical resistance in the contact area. The actual formation of a bond must be, at least in part, a diffusion-dependent process, and it is well known that diffusion rates in grain boundaries are much higher than in bulk material. At recrystallization temperatures there are, in effect, an infinite number of grain boundary paths, which may explain why such strong bonds are formed.

(5) The intended bond area in the present invention is at elevated temperatures just prior to and throughout the bonding process, thus decreasing the presence of volatile contaminants on the intended bond interface. Such contaminants are usually present due to imperfect cleaning procedures.

Figure 5:
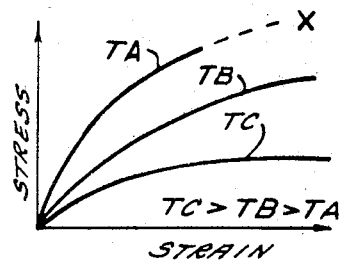
FIGURE 5 is a plot of stress vs. strain for a low, intermediate and high temperatures TA, TB and TC, respectively.

(6) There is no elastic recovery after the bond is made, since the workpiece is in a highly plastic state during ultrasonic bonding. That is, the linear left portion of the curve of FIGURE 5 is the elastic region where Hooke's Law is valid. If the bond was made in the elastic region, there would be a partial spring back of the elastically deformed section, thus adversely affecting the bond. In FIGURE 5, stress-strain curves are shown for low (TA), medium (TB) and high (TC) temperatures. The lower energy requirements for deformation at high temperatures result because, at such temperatures, strain can occur without further increase in the load; the metal continues to flow at a constant load. This is shown graphically by the horizontal portion of curve TC. The point "X" indicates fracture of a cold, plastically deformed workpiece; this can not happen in the present process.

The following specific examples describe bonding of aluminum and copper to various thin films by conventional ultrasonic methods and by the method of the invention. They are intended to be illustrative only and should not be interpreted in a limiting sense.

EXAMPLES

Figure 2:
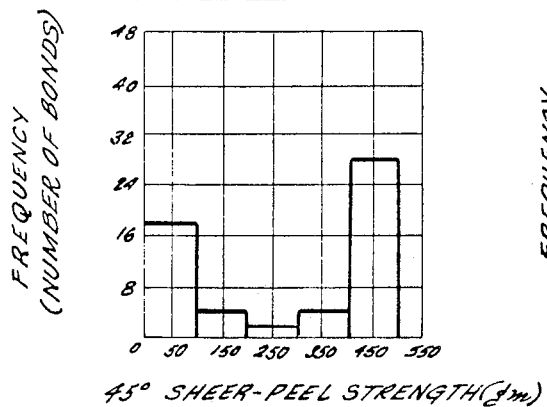

Investigations covering the ultrasonic bonding, without heat, of aluminum to tantalum thin-film substrates produced very erratic results and generally low bond strengths. The bonds usually caused imperfections (glass fracture) in the thin-film substrate, the result of transmission of vibratory energy to the substrate. Experimental results are shown in FIGURE 2 which is a histogram showing the distribution of 45-degree shear-peel strengths of 0.015 inch aluminum wire bonded to tantalum thin films. All bonds were made by using optimum bonding parameters of ultrasonic bond power, bond time and clamping force. However, as seen in FIGURE 2, the strength distribution extends between 0 and 500 grams for 50 bonds that were tested.

Figure 3:
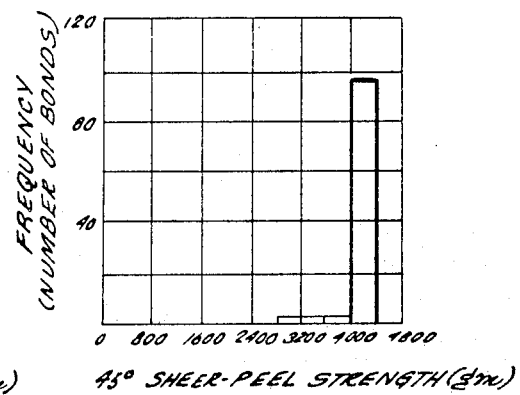

When the bond region was heated to the hot working temperature range of the aluminum lead prior to and during the application of ultrasonic energy, there was marked improvement in the bond strength as seen in the histogram of FIGURE 3. In this case, the bond region was heated to approximately 400° C. and, as seen in FIGURE 3, 97 out of 100 samples failed between 4000 and 4400 grams in a 45-degree shear-peel strength test.

Further experiments were conducted to show the relationship between the aluminum lead temperature and the bond strength. The results are shown in Table I. In these experiments a Chromel-Alumel (0.005 inch) thermocouple was inserted into a pierced hole of a 0.050 inch aluminum lead in the bond region. The lead, with the thermocouple, was then placed between the bond tip 27 and the tantalum thin-film substrate 11–12. By resistance heating the bond region of the aluminum lead 13 was preheated for four seconds and then bonded to the substrate with the heating continuing throughout the bond cycle. All bonding parameters were held constant throughout the experiment and the temperature attained during the bonding cycle was measured by a potentiometric recorder. The experiment was repeated three different times and the combined results appear in Table I. From Table I it will be seen that when the bond region of the aluminum lead was heated into the hot working temperature range, i.e., approximately 365° C. and above, the bond strength exceeded the aluminum lead strength. These bonds, averaging eight times stronger than comparable ultrasonic bonds, exceed the most rigorous requirements for this service.

TABLE I.—TEMPERATURE OF THE ALUMINUM BOND REGION vs. BOND CHARACTERISTICS

| Temperature of the bond region (° C.) | Bond strength | Description of bond region |
|---|---|---|
| 28 [1] | Negligible [2] | No visual signs of Al deformation. |
| 35 [1] | do | Do. |
| 63 | do | Very slight signs of Al deformation. |
| 64 | do | Do. |
| 70 | do | Do. |
| 85 | do | Slight signs of Al deformation. |
| 88 | do | Do. |
| 127 | do | Do. |
| 134 | do | Do. |
| 137 | do | Do. |
| 192 | do | Do. |
| 202 | do | Do. |
| 282 | do | Increased signs of Al deformation accompanied by glass fracture of the substrate |
| 305 | do | Do. |
| 367 | Bond Al lead strength | Al deformed readily. |
| 391 | do | Do. |
| 430 | do | Do. |
| 443 | do | Do. |
| 466 | do | Do. |
| 508 | do | Do. |

[1] No external heating
[2] "Negligible"—Aluminum lead fell off prior to or during mounting for a 45-degree shear-peel test.

Figure 4:
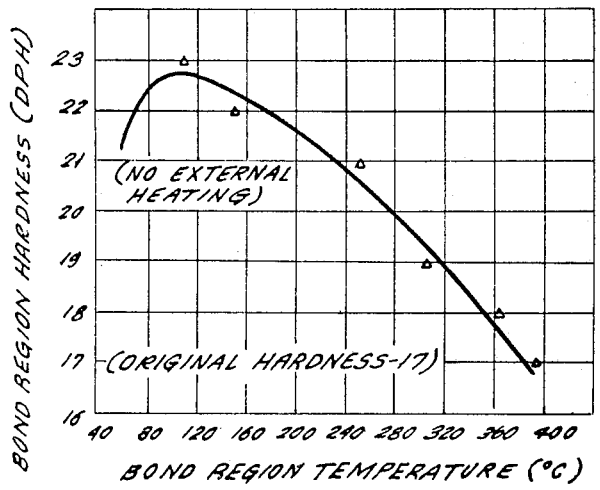
FIGURE 4 is a plot of bond region hardness vs. bond region temperature for bonds of aluminum to tantalum thin films.

Other experiments were conducted to show the relationship between the temperature and the hardness of the aluminum in the bond region. That is, since hot working is plastic deformation of a metal at such a temperature and rate that strain hardening does not occur (i.e. above the recrystallization temperature), it would be expected that ultrasonic bonding of aluminum in the hot working range would result in no increase in the final hardness of the deformed aluminum. Using a constant set of ultrasonic bonding parameters, 0.035 inch aluminum leads were ultrasonically bonded to tantalum thin-film substrates at different temperatures. The aluminum leads were then removed from the substrate by immersion in hydrofluoric acid. Hardness values were then taken in the bond region of the ultrasonically deformed aluminum leads with a Tukon (diamond point) hardness tester. The results of these tests are shown in the graph of FIGURE 4, wherein it can be seen that when an aluminum lead is heated within its hot working temperature range, the hardness value is equal to the hardness of the aluminum as received.

Thus, with the aluminum lead bond region heated in excess of 365° C., bond strength in excess of aluminum lead strength was obtained. Furthermore, the hardness data noted in FIGURE 4 substantiates the fact that a significant amount of aluminum work hardening takes place during ultrasonic bonding, but is substantially eliminated by bonding at elevated temperatures.

Further tests were carried out to determine the effectiveness of bonding copper to thin films at elevated temperatures and also to determine the extent of recrystallization.

It can be shown theoretically that recrystallization can occur in the relatively short period of a welding cycle. This is done by extrapolating isothermal recrystallization curves. Further, exponential rate equations have been developed for 50% recrystallization of 99.999% copper reduced 98% (Decker et al., AIME Trans., vol. 191, p. 548, 1951). From this data, the annealing time as a function of temperature was calculated for 99.999% and OFHC copper, as shown in Table II.

TABLE II.—EFFECT OF TEMPERATURE ON (50%) RECRYSTALLIZATION TIME

| Temp., ° C. | Time for 50% recrystallization, min. | |
|---|---|---|
| | OFHC Cu | 99.999% Cu |
| 25 | $4.95 \times 10^3$ | $1.74 \times 10^3$ |
| 100 | 1.88 | $6.62 \times 10^{-1}$ |
| 200 | $7.25 \times 10^{-3}$ | $2.25 \times 10^{-3}$ |
| 300 | $1.79 \times 10^{-4}$ | $6.32 \times 10^{-5}$ |
| 400 | $1.33 \times 10^{-5}$ | $4.67 \times 10^{-6}$ |
| 500 | $1.79 \times 10^{-6}$ | $6.32 \times 10^{-7}$ |

Since most ultrasonic welding cycles are not much longer than 2–3 seconds, it can be estimated from Table II that bonding above about 200° C. should provide sufficient time for at least partial nucleation of strain free grains in an ordinary welding cycle, and higher temperatures should give substantially complete recrystallization.

In this series of tests, a 100 watt 40 kc. ultrasonic welder was employed (Sonobond Corp) with a weld time of about one second at a power setting of 18 (low) and a clamping force of six pounds. The copper leads (99.999% Cu) were "balled" in argon and mildly etched to avoid possible surface oxidation side effects. The thin film was Pd/Cu/NiCr/Ta$_2$N deposited on an unglazed alumina substrate. Preheat time was about 3 seconds, various bonding temperatures having been established with a "balled" Chromel-Alumel junction. The bonds produced were subjected to 90-degree pull tests.

Figure 6:
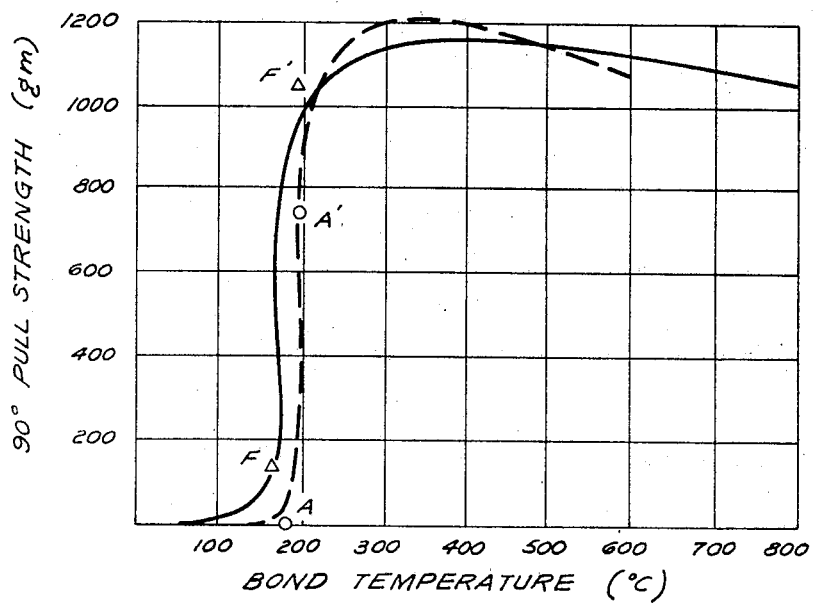
FIGURE 6 is a plot of ninety degree pull strength vs. bonding temperature for copper leads bonded to Pd/Cu/NiCr/$Ta_2N$ thin films on unglazed alumina substrates.

Results of tests run in air and forming gas are illustrated in FIGURE 6, which is a plot of 90-degree pull strength vs. weld temperature. As is obvious from this plot, there is a dramatic increase in weld strength in the area of 175°–200° C. The slight decrease in strength at higher temperatures may be due to annealing or grain growth in the wire portion of the lead away from the bond area (where fracture occurred). The curve for bonds made in air is the dotted line, and the curve for bonds made in forming gas is shown as a solid line. While the curves are quite close, the advantage of the forming gas atmosphere can be realized by noting the vertical distance between the points F and A and F' and A'. Thus, at a given temperature, bonds produced in the forming gas atmosphere (F and F') are considerably stronger than bonds produced in air (A and A').

Figure 7:
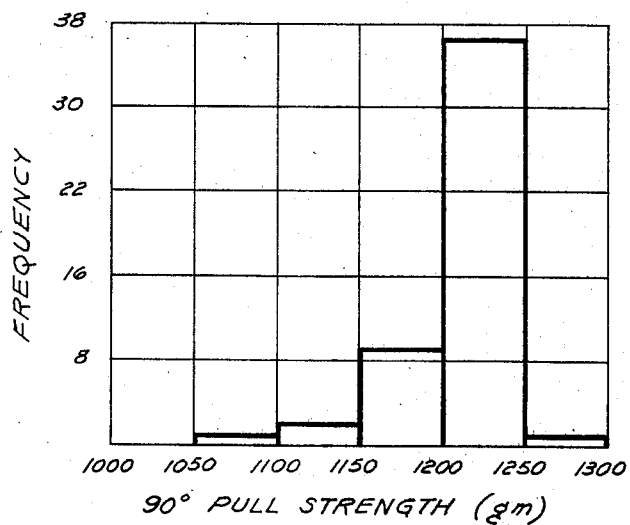
FIGURE 7 is a histogram showing the frequency strength distribution of copper leads bonded in accordance with the invention to a multilayer thin film on an alumina substrate.

Under the same conditions, and with forming gas, 50 leads were bonded at an average temperature of 404° C. (Range=360°–436° C.) and subjected to the 90-degree pull test. Results are reported in FIGURE 7, which is a histogram similar to FIGURES 2 and 3. Average pull strength was 1206 grams, which compares favorably with the average wire strength of 1260 grams. In all cases, the mode of failure was in the wire rather than the weld.

In a similar set of fifty bonds made in the same manner but without prior etching of the balled leads, the average pull strength was still 1200 gms., although there was a slightly greater spread in both directions.

Figure 8:
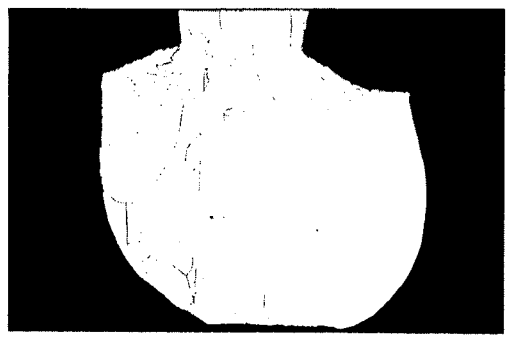
FIGURES 8–10 are photomicrographs of sections of balled copper leads bonded to a thin film deposited on an unglazed alumina substrate.
Figure 9:
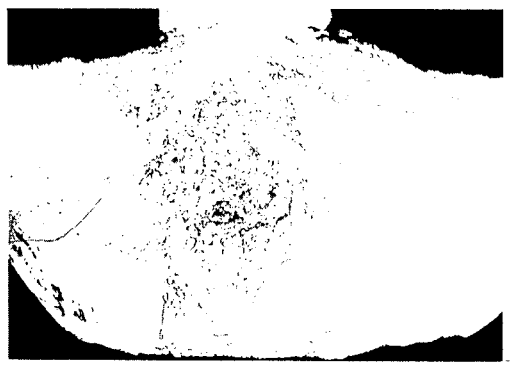
Figure 10:
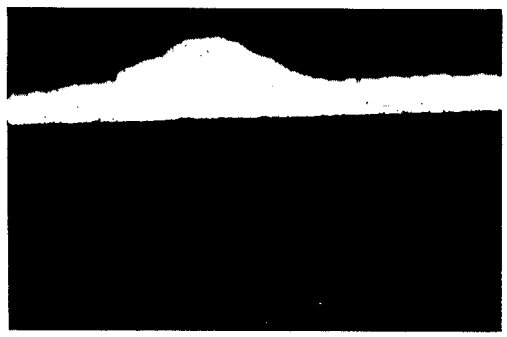

Samples from the various tests were examined metallographically. Ultrasonically bonded specimens clearly showed deformation markings and cold work within the individual columnar grains, as seen in FIGURE 8. Samples bonded in the 150°–200° C. range showed partial recrystallization in the area where the most strain markings occurred in the cold bonded samples, as seen in FIGURE 9. Samples bonded at higher temperatures exhibited a fully recrystallized structure, and a photomicrograph of one such sample is illustrated in FIGURE 10. The welding temperature for this sample was 530° C. In addition to the equiaxed, strain free grains, the conformance of the copper to the surface of the film is worthy of mention. The sections shown in the photomicrographs were prepared with an ammonia hydroxide-hydrogen peroxide etchant and photographed at a magnification of 200 diameters.

Various changes in the details, steps, materials and arrangements of parts, which have been herein described and illustrated in order to explain the nature of the invention, may be made by those skilled in the art within the principle and scope of the invention as defined in the appended claims.

What is claimed is:
1. A method of bonding a copper lead to a second workpiece comprising the steps of:
   placing the intended area of the copper lead on the intended bond area of the second workpiece;
   applying a holding force to the copper lead to hold the intended bond areas in contact when ultrasonic vibratory energy is transmitted to the copper lead and the second workpiece;
   heating the bond region of the copper lead prior to and during the use of ultrasonic vibratory energy to a temperature of at least the minimum recrystallization temperature of the lead and within its hot working temperature range;
   bonding said copper lead to said second workpiece within about three seconds with ultrasonic vibratory energy, said heating being effective, during said bonding, to substantially recrystallize the bond region of said copper lead.
2. The method of claim 1, wherein said heating is to at least about 200° C.
3. The method of claim 1 or 2, wherein said bond region is heated for about three seconds prior to application of said ultrasonic vibratory energy.
4. The method of claim 1 or 2, and additionally comprising providing a reducing atmosphere to the bond region during said bonding.
5. A method of bonding an aluminum lead to a second workpiece comprising the steps of:
   placing the intended bond area of the aluminum lead on the intended bond area of the second workpiece;
   applying a holding force to the aluminum lead to hold the intended bond areas in contact when ultrasonic vibratory energy is transmitted to the aluminum lead and the second workpiece;
   heating the bond region of the aluminum lead prior to and during the use of ultrasonic vibratory energy to a temperature of at least the minimum recrystallization temperature of the lead and within its hot working temperature range;
   bonding said aluminum lead to said second workpiece within about three seconds with ultrasonic vibratory energy, said heating being effective, during said bonding, to substantially recrystallize the bond region of said aluminum lead.
6. The method of claim 5, wherein said heating is to at least about 350° C.
7. The method of claim 5 or 6, wherein said bond region is heated for about three seconds prior to application of said ultrasonic vibratory energy.
8. The method of claim 5 or 6, and additionally comprising providing a reducing atmosphere to the bond region during said bonding.
9. The method of claim 1 or 5, wherein said second workpiece is a tantalum thin film.
10. A method of bonding a metallic, work-hardenable lead to a second workpiece comprising the steps of:
    placing the intended bond area of the lead on the intended bond area of the second workpiece;
    applying a holding force to the lead to hold the intended bond areas in contact when ultrasonic vibratory energy is transmitted to the lead and the second workpiece;
    heating the bond region of the lead prior to and during the use of ultrasonic vibratory energy to a temperature of at least the minimum recrystallization temperature of the lead and within its hot working temperature range;
    bonding said lead to said second workpiece within about three seconds with ultrasonic vibratory energy, said heating being effective, during said bonding, to substantially recrystallize the bond region of said lead.

References Cited

UNITED STATES PATENTS

| 2,946,119 | 7/1960 | Jones | 29—470 |
| 3,051,826 | 8/1962 | Avila | 219—85 X |
| 3,101,404 | 8/1963 | Hill | 29—497.5 X |
| 3,125,803 | 3/1964 | Rich | 29—504 X |
| 3,235,959 | 2/1966 | Bartoszak | 29—498 |
| 3,255,511 | 6/1966 | Weissenstern | 29—497.5 X |
| 3,316,628 | 5/1967 | Lang | 29—492 X |

OTHER REFERENCES

Sonoweld Ultrasonic Welding Equipment, © 1960, eight pages, Sonobond Corporation, class 228, subclass 1.

Metals Handbook, eighth edition, © 1961 by the American Society for Metals, pp. 936, 1008 and 1186.

JOHN F. CAMPBELL, Primary Examiner

R. J. SHORE, Assistant Examiner

U.S. Cl. X.R.

29—494, 497.5, 498, 504